United States Patent [19]

Anders et al.

[11] Patent Number: 4,491,448

[45] Date of Patent: Jan. 1, 1985

[54] JACKET APPLICATION DEVICE FOR A BOOK BINDING MACHINE

[75] Inventors: Helmut Anders, Rahden; Günter Dietrich, Hille, both of Fed. Rep. of Germany

[73] Assignee: Rahdener Maschinenfabrik August Kolbus GmbH & Co., Rahden, Fed. Rep. of Germany

[21] Appl. No.: 430,793

[22] Filed: Sep. 30, 1982

[30] Foreign Application Priority Data

Oct. 6, 1981 [DE] Fed. Rep. of Germany ....... 3139656

[51] Int. Cl.[3] ...................... B42C 11/02; B42C 11/04; B65G 47/26

[52] U.S. Cl. .......................................... 412/21; 412/4; 412/5; 412/19; 198/420; 198/722; 198/858

[58] Field of Search .......................... 412/4, 5, 19, 21; 198/420, 577, 722, 858

[56] References Cited

U.S. PATENT DOCUMENTS 1,355,455 10/1920 Bredenberg ........................... 412/4
1,543,378 6/1925 Frazier et al. ......................... 412/19
2,640,208 6/1953 De Florez et al. ............... 412/21 X
3,708,813 1/1973 Carter et al. ...................... 412/21 X
4,080,678 3/1978 Muller .

FOREIGN PATENT DOCUMENTS 2640497 3/1977 Fed. Rep. of Germany .
1052938 12/1966 United Kingdom ................. 412/21

*Primary Examiner*—Paul A. Bell
*Assistant Examiner*—Taylor J. Ross

[57] ABSTRACT

In a book binding machine, covers are individually brought into registration with and subsequently adhesively bonded to moving book blocks. The registration is accomplished by first moving the covers along a path parallel to the path of motion of the blocks at a speed which is slower than the blocks and then engaging the covers by an alignment mechanism which at the time of engagement moves in synchronism with the book block as the block overtakes the cover. The alignment mechanism travels about a circular path so as to periodically intercept a moving cover and is resiliently braked when synchronized movement with a book block is established.

11 Claims, 6 Drawing Figures

JACKET APPLICATION DEVICE FOR A BOOK BINDING MACHINE

BACKGROUND OF THE INVENTION (1) Field of the Invention

The present invention relates to the manufacture of books and particularly to the mating of covers with moving book blocks. More specificially, this invention is directed to a cover application device for book binding machines and especially to apparatus for feeding book covers into registration with continuously moving book blocks. Accordingly, the general objects of the present invention are to provide novel and improved methods and apparatus of such character.

(2) Description of the Prior Art

In the binding of books, book blocks having a glued spine are customarily moved along a conveying mechanism and it is necessary to provide means for feeding the book covers, which are individually withdrawn from a magazine, into registration with the blocks. An example of a prior art book cover transport and alignment mechanism may be seen from U.S. Pat. No. 4,080,678. In the apparatus of U.S. Pat. No. 4,080,678 the means which engage the book covers are driven by a chain system which operates at periodically alternating speeds. Thus a cover being transported is first caused to move at a speed which is higher than that of the continuously moving book blocks until it catches up with the book block. Subsequently, through cooperation with the tongs which are supporting the moving book block, the cover will be brought into alignment and synchronised movement with the block as a result of a braking action. Apparatus of the type disclosed in U.S. Pat. No. 4,080,678 has the disadvantage that, when the cover transporting means catches up with the book block conveyor and suddenly decelerates, the friction between the cover and the engaging means of its transport system is often insufficient to keep the cover aligned with the engaging means. When misalignment occurs, because of slipping of the cover, the cover will not be precisely aligned with the book block.

As a further disadvantage of prior cover application devices, the constant change in speed and direction of the chains of the transport system imposes forces on the system which cause noisy operation, the need for constant readjustment and lead to premature wear.

SUMMARY OF THE INVENTION

The present invention overcomes the above-briefly discussed and other deficiencies and disadvantages of the prior art by providing a novel and improved method of and apparatus for the application of covers to moving book blocks with a high degree of precision. Apparatus in accordance with the present invention is characterized by reliability and ease of adjustment.

In accordance with a preferred embodiment, the apparatus of the present invention comprises a transport mechanism for book covers having cover engaging means which are driven at a speed which is slower than that of the tongs or clamps of the book block conveyor. The movements of the cover engaging means are coordinated in time with the movement of the book-block tongs such that, during the aligning operation, the rear edge of the cover is located in front of the rear edge of the book block. The alignment operation is achieved through the use of aligning elements which contact the rear edge of the book-block tongs or the book block. These aligning elements are driven along a circular path with the movement thereof being coordinated in time with the movements of the cover engaging means and the book-block tongs. Thus, the alignment elements are caused to travel upwardly between a pair of cooperating book-block tongs and then are resiliently braked and aligned by the establishment of contact between a portion of the drive mechanism and the rear edge of a tong or book block. After the aligning elements are aligned with the book block, during their continued rotation, they come behind a cover and take over the continued movement thereof from the engaging means of the cover transport mechanism.

The present invention insures exact alignment of the covers with the book blocks since, when the covers are engaged by the aligning elements, alignment has already been achieved at the rear edge of the book-block carrying tongs or at the rear edge of the book block itself. Accordingly, there are only very slight speed differences between the engaging means of the cover transport mechanism and the aligning elements which receive the covers therefrom.

In accordance with a preferred embodiment, the aligning elements are driven via a parallel crank gear arrangment, rather than the previously used chain drives, and thus are subject to considerably less wear. Further, down time of apparatus in accordance with the present invention is reduced when compared to the prior art since drive chains for the cover aligning elements do not have to be periodically changed as a result of elongation thereof.

A further advantage of apparatus in accordance with the present invention is that, as a result of its construction, initial adjustment may be accomplished quickly and easily.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which.

DESCRIPTION OF THE DISCLOSED EMBODIMENT

Figure 1:
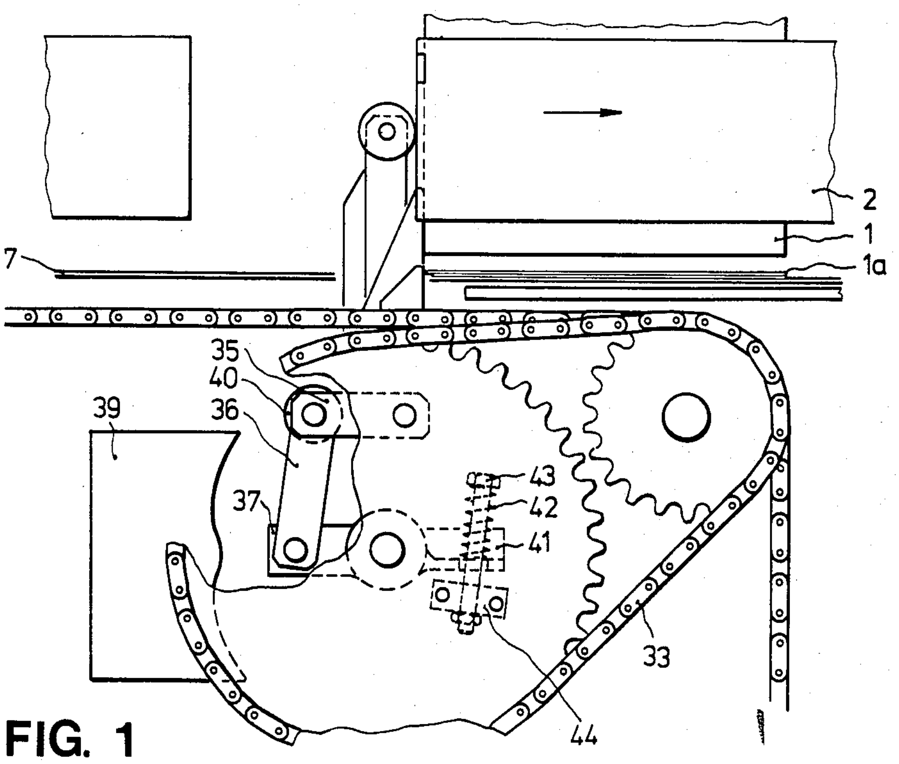
FIG. 1 is a side-elevation view, partly broken away to show detail, of a portion of a book binding machine including the cover aligning device of the present invention.
Figure 2:
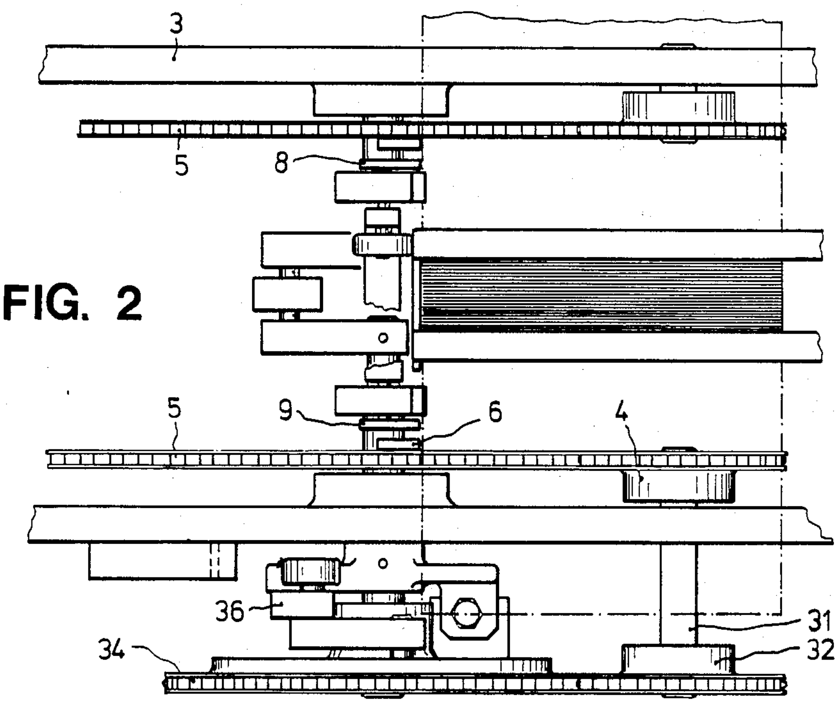
FIG. 2 is a top plan view of the apparatus of FIG. 1.
Figure 3:
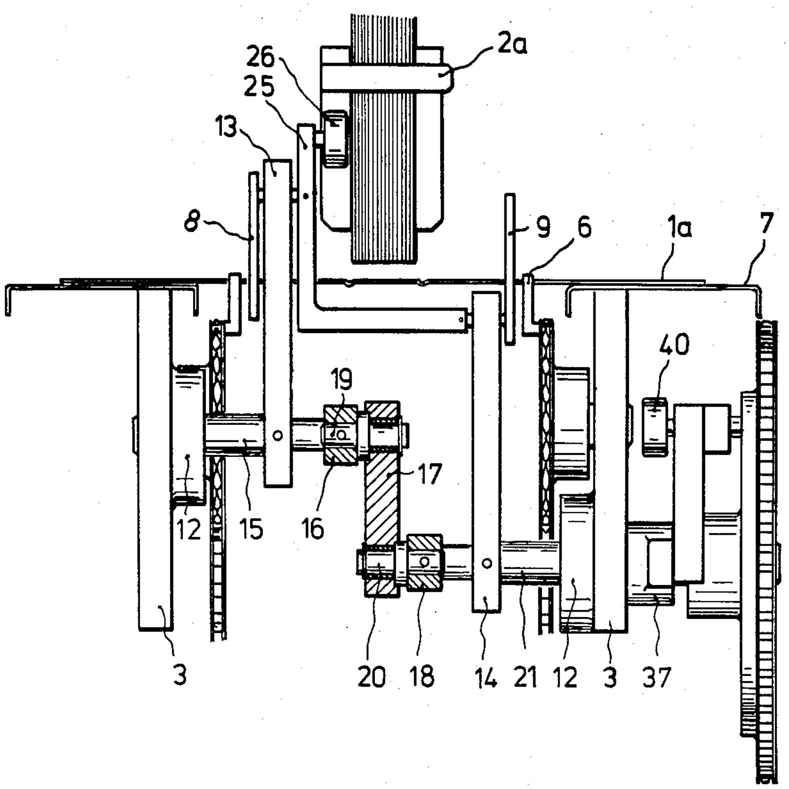
FIG. 3 is a front view of the apparatus of FIGS. 1 and 2.

With reference now to the drawing, a book binding machine with which the present invention will be employed will include a plurality of cooperating pairs of clamps or tongs 2 which are equally spaced and moveable continuously in a closed orbit. The tongs 2 receive and hold book blocks 1 which are being transported in the direction of the arrow on FIG. 1. A pair of endless chains 5 are supported, from parallel side frames 3, beneath the path of movement of the block tongs 2. The chains 5 are guided by sprockets 4 which are driven at a speed which is slightly lower than the speed of motion of the block tongs 2. The chains 5 carry book cover engaging means 6. The cover engaging means 6, as may best be seen from FIG. 3, contact and impart movement to book covers 1a which have been individually discharged from a magazine, not shown. During movement of the covers 1a, i.e., as the covers 1a are brought into alignment with the book blocks 1, they are in part supported on a table 7.

The cover aligning system of the present invention is positioned between the chains 5 and includes a pair of spacially displaced aligning fingers 8 and 9. Movement is imparted to fingers 8 and 9 by means of a parallel crank gear arrangement comprising two offset pairs of cranks 13, 14 and 16, 18. Crank 13 is mounted on a shaft 15 which, in turn, is rotatably supported in a mounting 12 of side frame 3. The free end of shaft 15, i.e., the end disposed away from mounting 12, rotatably engages crank 16. Crank 16 is rotatably connected, via a journal 19, to a connecting rod 17. Crank 14 is mounted on drive shaft 21. Drive shaft 21 is coupled to connecting rod 17 via crank 18 and journal 20.

The cranks 13 and 14 are interconnected, at points adjacent the ends thereof disposed outwardly with respect to respective support shafts 15 and 21, by means of an L-shaped connecting rod 25. Connecting rod 25 is an angle lever which causes the cranks 13 and 14 to form a rigid system from which fingers 8 and 9 are supported by means of journal bearings mounted within the respective cranks. This arrangement insures that, when the cranks 13 and 14 rotate about their respective shafts 15 and 21, the aligning fingers 8 and 9, which extend in opposite directions relative to their respective cranks, will always remain in a vertical orientation.

The leg of connecting rod 25 which is coupled to crank 13 extends outwardly past the end of the crank and carries a stop roller 26. The roller 26 is aligned with the edge of one of the book-block tongs as may best be seen from FIG. 3.

One of the book-block tongs carries a rear book-block stop 2a. Since the cover is to be aligned with the book block using the edge of the book-block tong as a reference, the stop roller 26 must be located relative to fingers 8 and 9 at a set-back position which is determined by the location of the book-block stop 2a on its supporting tong.

The parallel crank gear arrangement for imparting movement to fingers 8 and 9 is driven by shaft 31 which is connected to sprocket 4, sprocket 4 being driven by one of the chains 5. Shaft 31 is connected to a sprocket 32 which engages a further chain 33. Chain 33 passes around a sprocket 34 which is mounted for free rotation on an extension of shaft 21. Sprocket 34 is provided with a flange from which a crank 35 is supported. Crank 35 drives, via a lever 36, a further drive lever 37. Drive lever 37 is mounted on shaft 21 in such a manner as to be prevented from rotation about the axis of shaft 21. Thus, the drive lever 37 extends from its point of articulation to lever 36 to a point located at the opposite side of the axis of shaft 21 and lever 37 is coupled to sprocket 34 by means of a system which includes an anchor 44, affixed to the flange of sprocket 34, a bolt 43 and a spring 42. This arrangement may clearly be seen from FIG. 1.

The rotating aligning fingers 8 and 9 must be periodically decelerated before they extend upwardly into the plane of movement of the covers 1a. In order to accomplish this synchronized movement, the lever 36 supports a cam follower roller 40 which cooperates with a cam 39 affixed to the machine frame 3.

Figure 4:
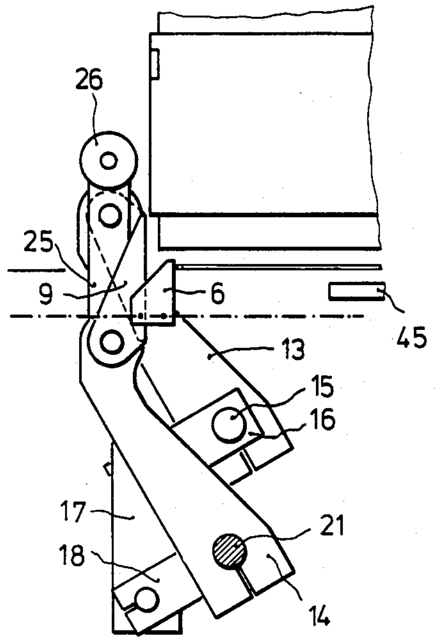
FIGS. 4, 5 and 6 are partial views of the apparatus of FIGS. 1–3 depicting various stages of the cover alignment cycle.
Figure 5:
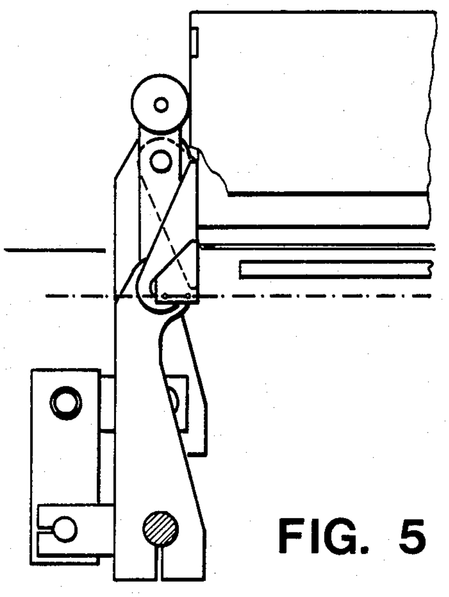

The operation of the cover application device of the present invention will now be described. As mentioned above, book blocks 1 are held in tongs 2 and transported continuously along a linear path. The position of the book blocks with respect to the tongs is determined by means of the tong mounted rear stop 2a. Covers 1a, removed individually from a magazine, are caused to move forward at a speed which is somewhat lower than that of the speed of movement of the book blocks 1, the movement of the covers being caused by engaging means 6 carried by chains 5. As may be seen from FIG. 4, the covers will initially be located such that the trailing edge thereof is slightly in front, in the direction of movement of both the book block and cover, of the rear edge of the book block to which the cover is to be applied.

The aligning fingers 8 and 9 are driven at a speed which is greater than the speed of movement of the engaging means 6. The drive for the aligning fingers 8 and 9 causes the fingers to first be brought into alignment with the rear edge of the book-block tongs and, subsequently, the fingers 8 and 9 will overtake the cover 1a and assume command over the movement thereof from the engaging means 6 whereupon the cover 1a will be exactly aligned with the book block 1 to which it is to be applied. Alignment of the fingers 8 and 9 with the rear edge of the book-block tong is accomplished by means of the cooperation between the stop roller 26 and the edge of a tong.

The interpositioning of the spring element 42 in the drive connection between sprocket 34 and shaft 21 prevents abrupt contact by roller 26 against the edge of the cooperating tong.

Figure 6:
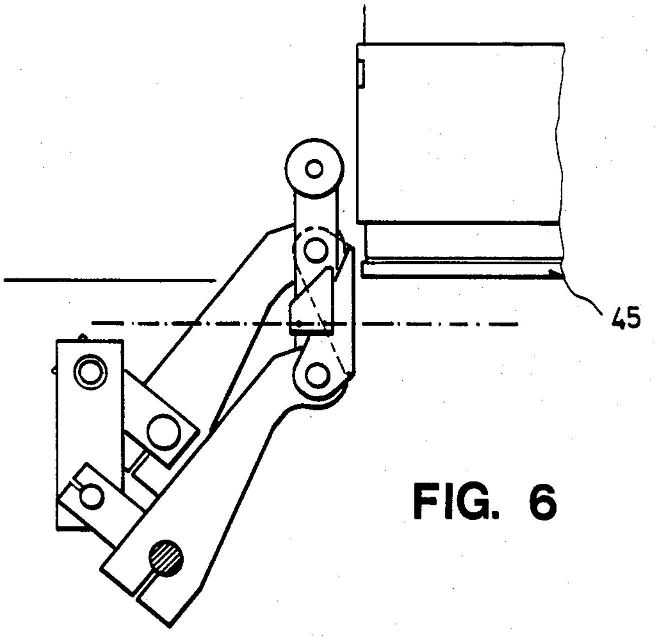

After alignment of the cover 1a with the book block 1, as represented in FIG. 6, the aligning fingers 8 and 9 and stop roller 26 drop downwardly in their orbit and a lifting table 45 moves the cover upwardly into contact with the glued book-block spine.

It is to be understood that the invention is not limited to the embodiment described and shown herein, which is deemed to be illustrative of the best mode of carrying out the invention, and which is susceptible to modification of form, size, arrangement of parts and details of operation. The invention rather is intended to encompass all such modifications which are within its spirit and scope as defined by the claims.

What is claimed is:

1. In apparatus for applying a cover to a book block, the apparatus comprising book block supporting tongs movable along a linear path and a lifting element for urging the cover into contact with the spine of a moving book block carried by the tongs, an improved cover transporting and alignment mechanism comprising:

engaging means for moving individual covers along a path which is generally parallel to the path of movement of the book blocks, said engaging means moving at a linear speed which is less than the linear speed of the book block supporting tongs;

movable cover alignment means, said cover alignment means including at least a first cover contacting alignment element;

registration establishing means, said registration establishing means being connected to said alignment means for movement therewith, said registration establishing means being operatively coupled to a book block supporting tong to determine the positioning of said alignment means relative to a moving block; and drive means for causing said alignment means and said registration establishing means to be simultaneously driven about closed non-linear paths, said drive means being operatively coupled to said engaging means and causing said alignment means to travel in the direction of movement of said engaging means at a speed which is greater then the speed of movement of said engaging means, said drive means including means for resiliently braking said alignment means when said registration establishing means overtakes a moving book block.

2. The apparatus of claim 1 wherein said drive means imparts rotation about a closed loop to said alignment means alignment element and comprises a pair of parallelly arranged crank members, said crank members being positioned laterally outwardly with respect to the book block tongs and being joined by a connecting rod.

3. The apparatus of claim 2 wherein said connecting rod includes an extension which projects past the end of said crank members and wherein said registration establishing means is mounted on said connecting rod extension.

4. The apparatus of either of claims 2 or 3 wherein said drive means further comprises a drive wheel, said drive wheel being coupled to said engaging means for rotation thereby, and wherein said means for resiliently braking includes a resilient drive connection between said drive wheel and said crank members.

5. The apparatus of claim 1 wherein said drive means comprises means for periodically decelerating said alignment means alignment element and registration establishing means.

6. The apparatus of claim 5 wherein said drive means imparts rotation about a closed loop to said alignment means alignment element and further comprises a pair of parallely arranged crank members, said crank members being positioned laterally outwardly with respect to the book block tongs and being joined by a connecting rod.

7. The apparatus of claim 6 wherein said connecting rod includes an extension which projects past the end of one of said crank members and wherein said registration establishing means is mounted on said connecting rod extension.

8. The apparatus of claim 7 wherein said alignment means alignment element comprises a cover contacting finger affixed to one of said crank members and wherein said registration establishing means includes a book block supporting tong contacting member.

9. The apparatus of claim 8 wherein said alignment means further comprises:

a second cover contacting finger affixed to the other of said crank members, said fingers being parallel.

10. The apparatus of claim 9 wherein said drive means further comprises a drive wheel and means rotatably coupling said drive wheel to said engaging means, and wherein said means for resiliently braking comprises a resilient drive connection between said drive wheel and said crank members.

11. The apparatus of claim 10 wherein said means for periodically decelerating comprises a fixed position cam and a cam follower mounted on said resilient drive connection.

* * * * *